United States Patent [19]
Jenkins et al.

[11] Patent Number: 5,987,105
[45] Date of Patent: Nov. 16, 1999

[54] APPLIANCE COMMUNICATION SYSTEM

[75] Inventors: Jonathan Peter Jenkins; David Charles Rhodes, both of Auckland, New Zealand

[73] Assignee: Fisher & Paykel Limited, Auckland, New Zealand

[21] Appl. No.: 09/103,382

[22] Filed: Jun. 24, 1998

[30] Foreign Application Priority Data

Jun. 25, 1997 [NZ] New Zealand ............................ 328191
Apr. 15, 1998 [NZ] New Zealand ............................ 330211

[51] Int. Cl.$^6$ .................................................. H04M 11/00
[52] U.S. Cl. ...................................... 379/106.01; 340/679
[58] Field of Search .......................... 379/102.01, 102.04, 379/102.07, 106.01, 106.07, 106.11, 92.01, 92.03, 92.04, 110.01; 340/533, 679, 310.06, 310.08

[56] References Cited

U.S. PATENT DOCUMENTS 5,506,892  4/1996  Kojima et al. ...................... 379/102.07
5,757,643  5/1998  Kuroda et al. ...................... 379/102.01

Primary Examiner—Wing F. Chan
Attorney, Agent, or Firm—Trexler, Bushnell, Giangiorgi & Blackstone, Ltd.

[57] ABSTRACT

A home appliance, such as a laundry washing machine or refrigerator including a buzzer designed to sound an alarm or provide an audible indication of a certain condition is disclosed. The appliance may transmit information (such as diagnostic or fault codes and appliance usage information) to a remote service center without the need for a physical connection to a telephone line. The buzzer may be controlled to produce audible tones in a predetermined format which can be transmitted from the appliance, through the air and down a telephone line through a telephone handset to the service center. The signal is recorded at the service center and the data extracted. The data is then analyzed to obtain the fault and/or usage information.

18 Claims, 12 Drawing Sheets

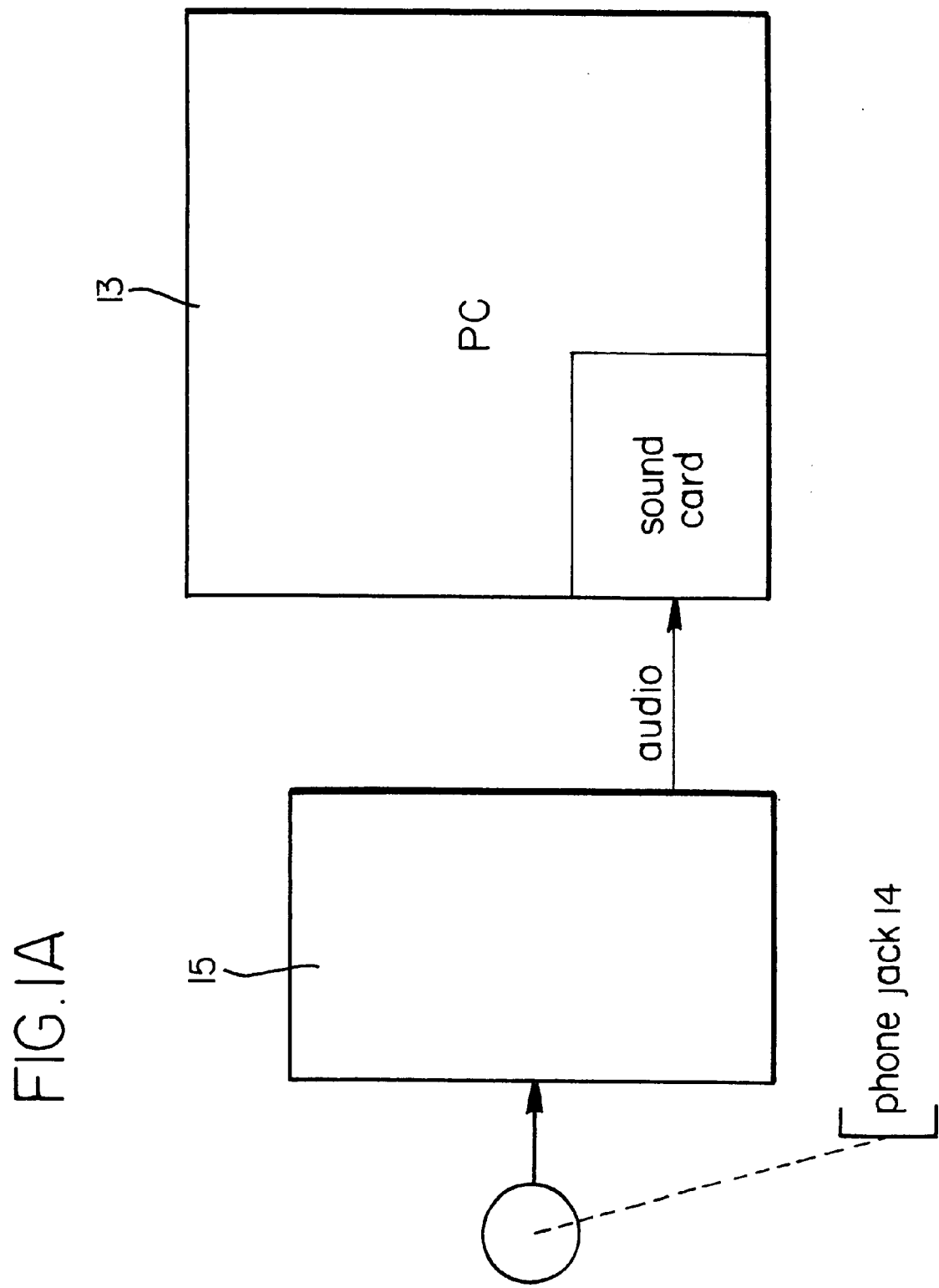

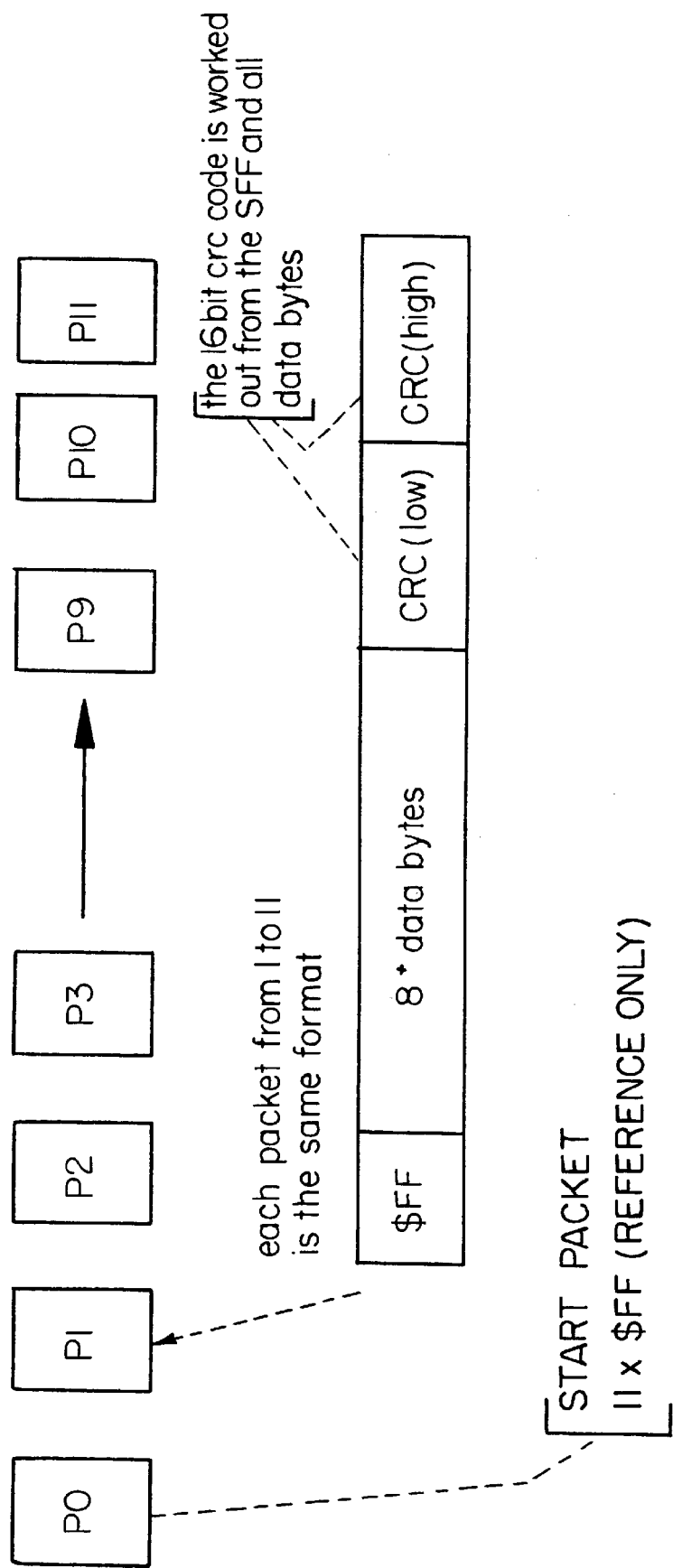

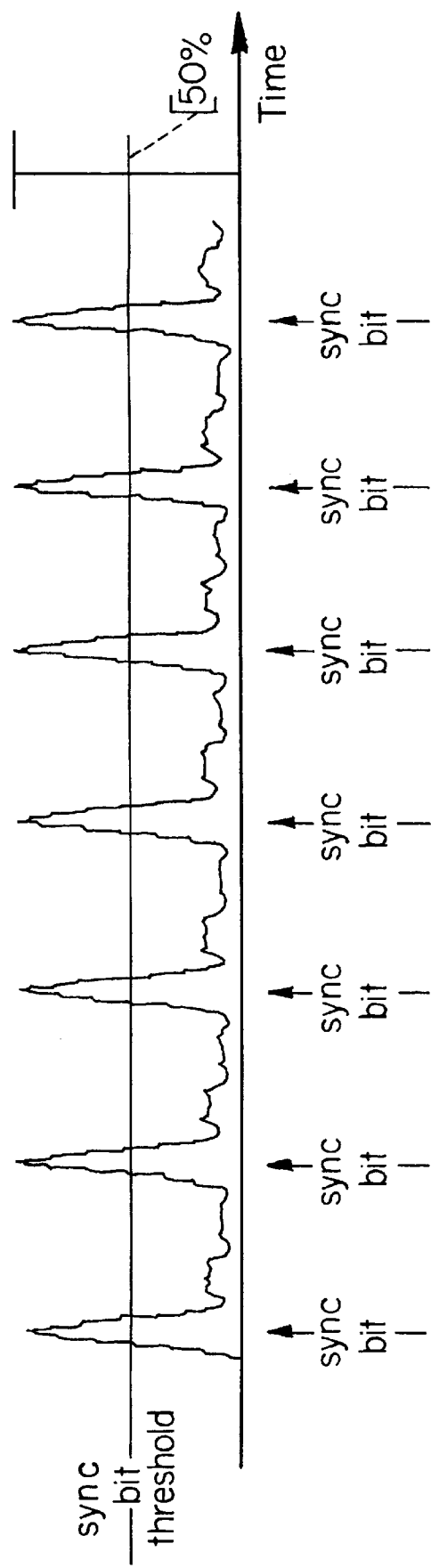

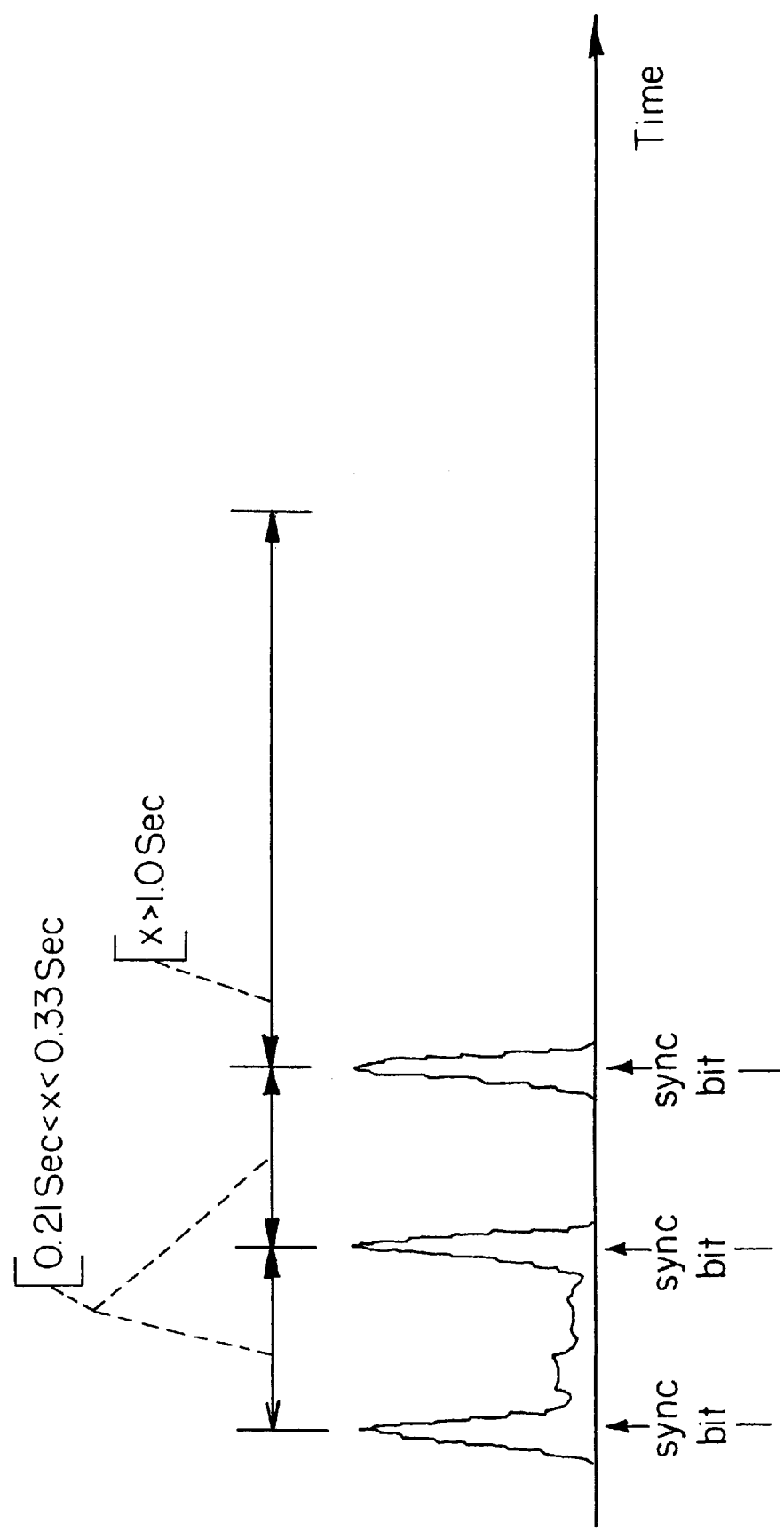

Time

Time

FIG.9

| | A0 | A1 | A2 | A3 | A4 | A5 | A6 | A7 | A8 | A9 | A10 | B0 | B1 | B2 | B3 | B4 | B5 | B6 | B7 | B8 | B9 | B10 |
|---|---|---|---|---|---|---|---|---|---|---|---|---|---|---|---|---|---|---|---|---|---|---|
| b0 | 76 | 70 | 65 | 66 | 64 | 66 | 61 | 76 | 94 | 78 | 100 | 100 | 7 | 7 | 5 | 5 | 10 | 11 | 6 | 52 | 5 | 6 |
| b1 | 92 | 91 | 83 | 88 | 83 | 86 | 84 | 92 | 99 | 96 | 100 | 79 | 10 | 8 | 7 | 7 | 17 | 13 | 100 | 14 | 10 | 9 |
| b2 | 93 | 91 | 89 | 90 | 88 | 86 | 82 | 80 | 88 | 96 | 100 | 100 | 10 | 12 | 10 | 7 | 83 | 13 | 9 | 86 | 9 | 10 |
| b3 | 94 | 91 | 86 | 93 | 94 | 89 | 92 | 98 | 97 | 100 | 99 | 90 | 5 | 4 | 3 | 2 | 82 | 91 | 100 | 11 | 10 | 5 |
| b4 | 90 | 89 | 84 | 86 | 83 | 79 | 92 | 100 | 99 | 94 | 92 | 93 | 7 | 2 | 4 | 2 | 93 | 8 | 9 | 92 | 93 | 100 |
| b5 | 100 | 95 | 89 | 96 | 93 | 94 | 98 | 90 | 97 | 94 | 95 | 100 | 6 | 8 | 5 | 5 | 12 | 81 | 9 | 72 | 80 | 8 |
| b6 | 88 | 89 | 87 | 88 | 89 | 88 | 91 | 100 | 93 | 89 | 86 | 100 | 2 | 3 | 2 | 3 | 9 | 98 | 6 | 10 | 7 | 12 |
| b7 | 71 | 68 | 68 | 58 | 73 | 68 | 84 | 75 | 90 | 96 | 100 | 100 | 11 | 7 | 6 | 11 | 81 | 6 | 15 | 15 | 10 | 99 |

FIG.11

| | P | A | P | B | P | C | P | D | P | E | P | F | P | G | P | H | P | I | P | J | P | K | P | L |
|---|---|---|---|---|---|---|---|---|---|---|---|---|---|---|---|---|---|---|---|---|---|---|---|---|
| b0 | 60 | 99 | 57 | 76 | 53 | 85 | 83 | 78 | 92 | 84 | 78 | 71 | 93 | 51 | 83 | | 99 | | | | | | | |
| b1 | 82 | 78 | 86 | 83 | 74 | 82 | 89 | 86 | 77 | 91 | 86 | 66 | | 99 | | | 99 | | | | | | | |
| b2 | 79 | 82 | 95 | 91 | 90 | 95 | 91 | 94 | 88 | 88 | 90 | 92 | | | | | | | 20 | | | | | |
| b3 | 85 | 81 | 86 | 84 | 89 | 85 | 92 | 96 | 84 | 90 | 89 | 80 | | | | | | | | | | | 16 | 15 |
| b4 | 78 | 91 | 88 | 87 | 79 | 78 | 80 | 83 | 89 | 87 | 89 | 85 | | | | | 99 | | | 14 | | | | |
| b5 | 88 | 71 | 62 | 84 | 94 | 64 | 99 | 77 | 82 | 98 | 86 | 80 | | 95 | | | 36 | 99 | 34 | | | 16 | | |
| b6 | 85 | 97 | 92 | 90 | 72 | 94 | 67 | 96 | 99 | 94 | 93 | 78 | | 56 | | | 94 | | 96 | | | | | |
| b7 | 57 | 80 | 93 | 84 | 76 | 72 | 78 | 87 | 98 | 87 | 78 | 94 | | 98 | | | 99 | | 99 | 38 | 95 | | | 59 |

First threshold | Second threshold

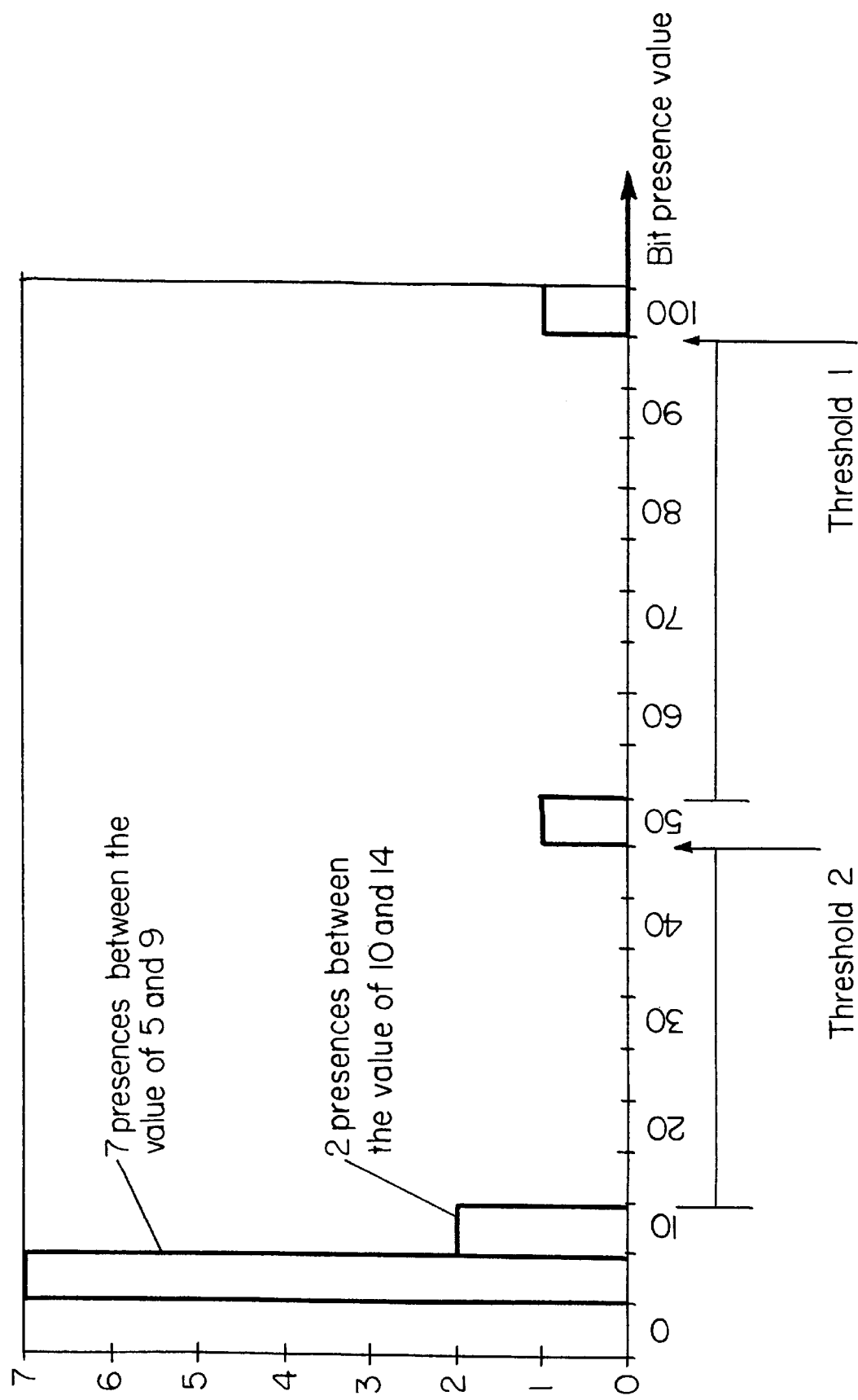

FIG. 12

|    | B0  | B1  | B2  | B3  | B4  | B5  | B6  | B7  | B8  | B9  | B10 | ECK |
|----|-----|-----|-----|-----|-----|-----|-----|-----|-----|-----|-----|-----|
| PA | $FF | $FF | $FF | $FF | $FF | $FF | $FF | $FF | $FF | $FF | $FF | OK  |
| PB | $FF | $00 | $00 | $00 | $00 | $9C | $68 | $0A | $35 | $30 | $90 | OK2 |
| PC | $FF | $21 | $00 | $01 | $82 | $06 | $51 | $00 | $00 | $B2 | $E9 | OK5 |
| PD | $FF | $FF | $07 | $BE | $01 | $00 | $09 | $61 | $11 | $7F | $2F | OK  |
| PE | $FF | $00 | $00 | $00 | $00 | $FF | $FF | $00 | $00 | $59 | $8F | OK  |
| PF | $FF | $00 | $00 | $00 | $00 | $00 | $00 | $00 | $FF | $58 | $1B | OK  |
| PG | $FF | $00 | $00 | $00 | $00 | $01 | $01 | $FF | $C0 | $08 | $57 | OK  |
| PH | $FF | $05 | $33 | $06 | $00 | $00 | $C6 | $01 | $01 | $BA | $FA | OK  |
| PI | $FF | $00 | $00 | $00 | $00 | $01 | $05 | $05 | $B7 | $0B | $16 | OK  |
| PJ | $FF | $02 | $00 | $00 | $00 | $01 | $C8 | $16 | $91 | $97 | $BC | OK  |
| PK | $FF | $3E | $80 | $A4 | $29 | $01 | $0F | $04 | $3F | $6D | $36 | OK  |
| PL | $FF | $0A | $1C | $32 | $42 | $53 | $63 | $6D | $77 | $F5 | $E4 | OK3 |

# APPLIANCE COMMUNICATION SYSTEM

BACKGROUND OF THE INVENTION

1. Field of the Invention

This invention relates to appliances and more particularly, though not solely to home appliances with inbuilt sound generating devices capable of producing audible noise in a controlled manner which may then be transmitted (for example, by telephone) as data to a remote receiving location.

2. Description of the Prior Art

Some home appliances (such as laundry washing machines and refrigerators) are today fitted with a serial communications port (or other similar output device) allowing the appliance to be connected to a personal computer which, utilising purpose built software, may interrogate information stored within the appliance. The information stored by the appliance may include the appliance's present status, temperatures, status of valves/shutters, user settings, fault information and number of cycles completed. As it is sometimes difficult or inconvenient for a service person to visit the site at which the appliance is located (which may be many kilometers from the service person's base) some existing home appliances have been fitted with modems to allow a service person to remotely interrogate data stored in the appliance. However, the additional cost involved in fitting all production appliances with a modem is unacceptably high. In addition, the user of the machine would be required to connect a telephone line to the appliance (either sharing an existing telephone line or installing a new one) and this is clearly unacceptable.

Most modem home appliances are at least fitted with a buzzer or beeper (for example a simple piezo-electric device) to, for example, alert the user that the washing cycle of a laundry washing machine or dishwasher is completed or the door of a refrigerator is open. Accordingly, it would be an advantageous improvement to utilise the existing noise producing capability of the appliance in the production of a data signal rather than adding additional expensive hardware.

In any event, if the audible data signal is produced at the home appliance and the point of entry of the data signal into the communications network (for example the telephone network) is some distance from the appliance, then the audible data signal must first travel some distance through (and be influenced by) the home appliance's surroundings (for example, air, walls, carpets, curtains and furniture). These surroundings introduce changes to the data signal through the introduction of noise (such as the introduction of echos) which must somehow be accounted for or removed from the transmitted data signal.

Accordingly, it is an object of the present invention to provide an appliance comprising:

sound generating means adapted to, upon appropriate energisation, produce audible tones ordinarily provided as a warning and/or verification signal to a user, user input means to allow a user to enter instructions to said appliance, data storage means which stores information on the operation of said appliance, control means which stores a program which causes the controller to:

i) receive said instructions from said user input means, ii) enter a special operating mode in response to said user input, and iii) energise said sound generating means to issue audible tones in a predetermined sequence corresponding to information stored in said data storage means.

In a second aspect, the invention consists in a method of controlling an appliance, said appliance having sound generating means adapted to, upon appropriate energisation, produce audible tones ordinarily provided as a warning and/or verification signal to a user, user input means to allow a user to enter instructions to said appliance, data storage means which stores information on the operation of said appliance, control means which controls the operation of said appliance, said method comprising the steps of:

i) receiving said instructions from said user input means, ii) entering a special operating mode in response to said user input, and iii) energising said sound generating means to issue audible tones in a predetermined sequence corresponding to information stored in said data storage means.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples.

BRIEF DESCRIPTION OF THE DRAWINGS

One preferred form of the present invention will now be described with reference to the accompanying drawings in which;

FIG. 1A is a detailed schematic of data communications at the remote site shown in FIG. 1, FIG. 3 is a diagram showing the complete structure of the data signal transmitted in the communications system shown in FIG. 1, FIG. 4 is a graph of signal strength versus time for part of the data signal transmitted in FIG. 1 which has been filtered at the frequency of the start/sync bit to demonstrate the detection of sync bits, FIG. 5 is a graph of signal strength versus time for part of the data signal transmitted in FIG. 1 which has been filtered at the frequency of the start/sync to demonstrate an end of download condition, FIG. 9 is a "bit presence table" for two packets from the data signal transmitted in FIG. 1 showing the normalised "value" for each bit after the time domain filter has been applied, FIG. 10 is a graph showing the distribution of "bit presence vales" for the data in FIG. 9, FIG. 11 is a table showing the threshold values which have been determined for each of the bits in each packet shown in FIG. 9, FIG. 12 is a table showing the actual data produced, from the data signal transmitted in FIG. 1, at the remote service centre after the download and data extraction have been carried out.

DETAILED DESCRIPTION OF THE PREFERRED EMBODIMENT

Figure 1:
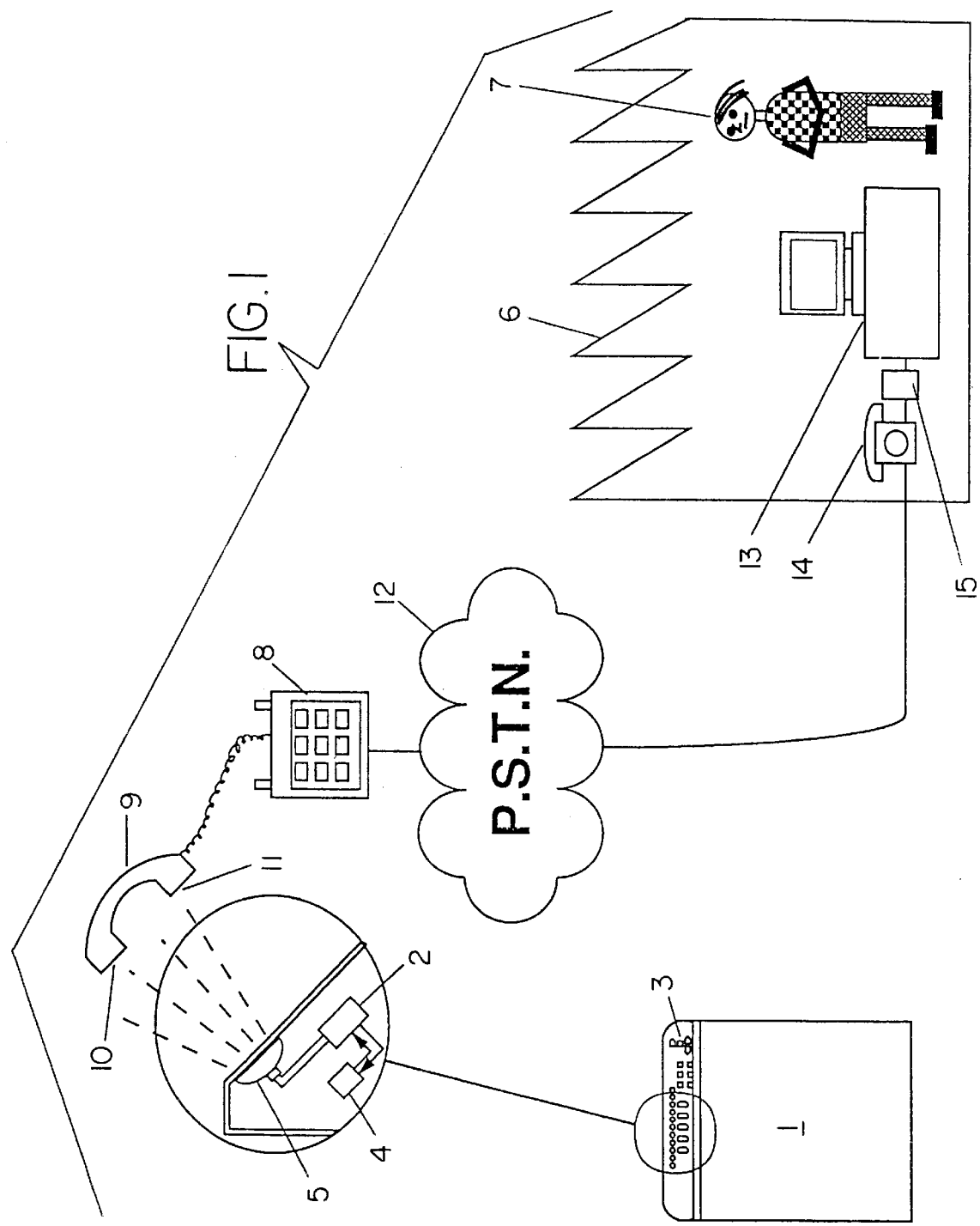
FIG. 1 is a schematic diagram showing the data transmission path in the communication system according to the preferred embodiment of the present invention.

With reference to the figures and in particular FIG. 1, an appliance, for example a home appliance such as an automatic clothes washing machine 1 is shown. It should be noted that the invention is to be described with reference to a clothes washing machine, however other appliances such as, for example, refrigerators, freezers, clothes driers, dishwashers, stoves, microwave ovens could just as validly be used. The washing machine 1 is preferably of an automatic type such as that sold under our Trade Mark SMART DRIVE. The washing machine includes a spin tub within a water container, the spin tub rotated by an electric motor (not shown). Washing machine 1 has a control means or electronic controller 2 which is programmed to carry out the operation of the washing machine by executing software (stored in a memory device 4 associated with the controller) in response to inputs from physical sensors within the machine and also from user input such as input buttons 3.

During execution of the software controlling operation of washing machine 1, various inputs, statuses (such as drain pump on, hot water valve open), serial number, number of cycles completed, alerts, errors, faults (such as drain pump blocked, cold water tap not turned on or motor error) and other problems are detected and recorded in memory device 4. This information, stored in memory device 4, could be as a result of a fault which has caused the washing machine to stop operation (awaiting technical assistance) or could be minor, not requiring the washing machine to be stopped.

As can be seen in FIG. 1, controller 2 is also connected to control the energisation of a sound generating means 5. Sound generating means 5 may comprise a loudspeaker or piezo buzzer as is ordinarily provided on modem electronic washing machines and other home appliances. As in conventional home appliances, controller 2 is programmed to energise speaker 5 to produce audible tones of predetermined frequencies and/or durations, in a similar way to modem electronic household or office equipment which produce an audible tone at predetermined times to alert a user to certain events. The audible signal thus produced is encoded with the information stored in memory device 4. The audible data signal is transmitted to a signal conversion means, for example a standard telephone handset where the audible data signal is converted to an electronic data carrying signal for transmission through the telephone network.

The audible data signal could be compared to that produced by a facsimile machine or modem however there are a number of significant differences due to the requirement that the audio signal in the present system must travel through an air gap between the buzzer and the telephone network. When the audio signal passes through the air gap it is may be blocked by objects such as walls or furniture and may also be reflected off walls and furniture thus producing a delayed echo signal at the telephone handset.

In use, a user of the washing machine 1, when discovering that the machine has developed a fault, would telephone the manufacturer (or manufacturer's agent) at a service centre 6, in the normal way to report the fault. Ordinarily a service person 7 would be despatched to investigate the fault, identify the problem and rectify it. However, in order to make this process more efficient, in the system according to the present invention, once the user of the washing machine is in telephone contact with the service centre via the user's telephone 8, the service person (via their own telephone 14) will instruct the user to hold the handset 9 of their telephone near the console of the washing machine and press a series of buttons to place the washing machine into a special operating mode. Once in the special operating mode, controller 2 will energise speaker 5 in such a way as to produce audible tones corresponding to (or encoded with) information stored in memory device 4 (one preferred method of encoding is described in detail below).

The audible tones produced by speaker 5 are then converted to electrical audio signals by transducer 11 in the mouth piece of handset 9. The electrical audio signals are then transmitted through the Public Switched Telephone Network 12 to the service centre 6. At the service centre the audio electrical signals are then passed through a signal conditioning circuit 15 (such as a transformer and/or filter) to a remote receiving means 13 (which may comprise a further control means or preferably a personal computer) at service centre 6. Personal computer 13 executes software which enables it to decode the audio electric signals to reproduce the original information stored therein and display it to the service person 7.

The data thus transmitted to the service centre could then be stored in a master database to provide invaluable practical usage and operational information for washing machines or other home appliances "in the field" as well as providing accurate and pertinent data to the service person to evaluate any problem with the washing machine. The service person may then speak to the user again over the telephone line and issue instructions on how to fix the problem (for example resetting the machine or turning on a water valve which has accidentally been left off) depending on the established cause or arrange a suitable time for the service person to call to service the machine, in which case the service person will ensure that they have the required spare parts and tools to remedy the problem before departing the remote service centre.

ILLUSTRATIVE EXAMPLE

The following is a broad overview of one particular embodiment of an application of the present invention followed by a more detailed explanation of the embodiment.

Recording The Download

The user of the appliance (this example relates to a laundry washing machine 3) dials the telephone number of a service centre 6. After discussing their situation with the operator 7 at the service centre the user would be instructed place the telephone down and proceed to the washing machine 3 and presses the key or key combination (on the standard user interface panel) required to start a download in accordance with software stored in control means 2. The washing machine 3 then preferably makes one beep via buzzer 5 to indicate that the key or keys were pressed and then preferably there is a delay of 2 seconds before the data download starts at which time the buzzer commences a stream of audible tones which are transmitted from the washing machine 3, through the air and into the telephone mouthpiece. The operator 7 at the remote service centre 6 initiates the recorder part of a software program stored in personal computer 13 which starts analysing the input download data signal and records it to a storage means on personal computer 13 (for example in RAM or on a magnetic disk).

Data Extraction

Once the download is completed, the user of the washing machine 3 picks the telephone up and waits for operator 7 at the service centre 6 to come back on to the telephone line. During this time, the personal computer 13 at the remote service centre 6 extracts the data from the download. Because there is a possibility that errors occurred in the transmission/extraction process (due to background noise and/or signal weakness) the software according to the present invention is capable of taking several downloads from the same washing machine and joining them together to obtain one good download, therefore if there are errors, the operator of the personal computer would instruct the user to place the telephone down and repeat the procedure to provide personal computer 13 more download data which hopefully can be combined with the already recorded data to produce an error free data record.

Analysing The Download Data

Once an error free download is extracted the operator of the PC would look at the data and inform the customer of the problem with their product.

The following is a detailed description of the preferred embodiment of the present invention starting with the way in which the data signal is formatted and produced by the software executed by controller 2 of washing machine 3 and continuing on to the recorder and extractor phases of the software executed by personal computer 13 at the service centre 6.

Detailed Description of Download Format (From Appliance to Telephone/PC)

"Byte"

Figure 2:
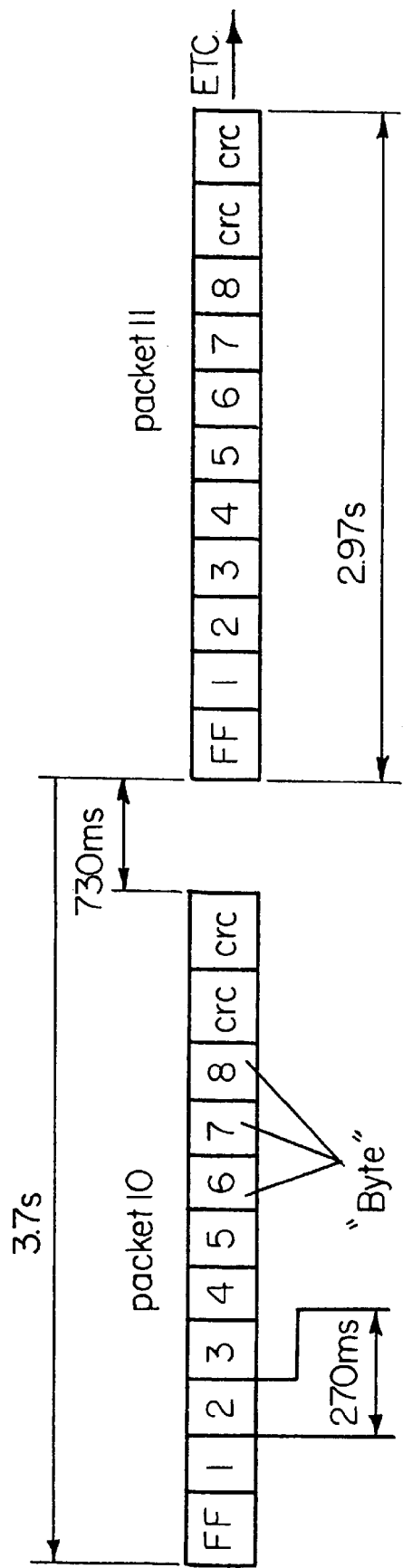
FIG. 2 is a diagram showing how the data packets transmitted in the communications system of FIG. 1 are made up and how the component bytes of the packets and the packets themselves are divided in time.
Figure 2A:
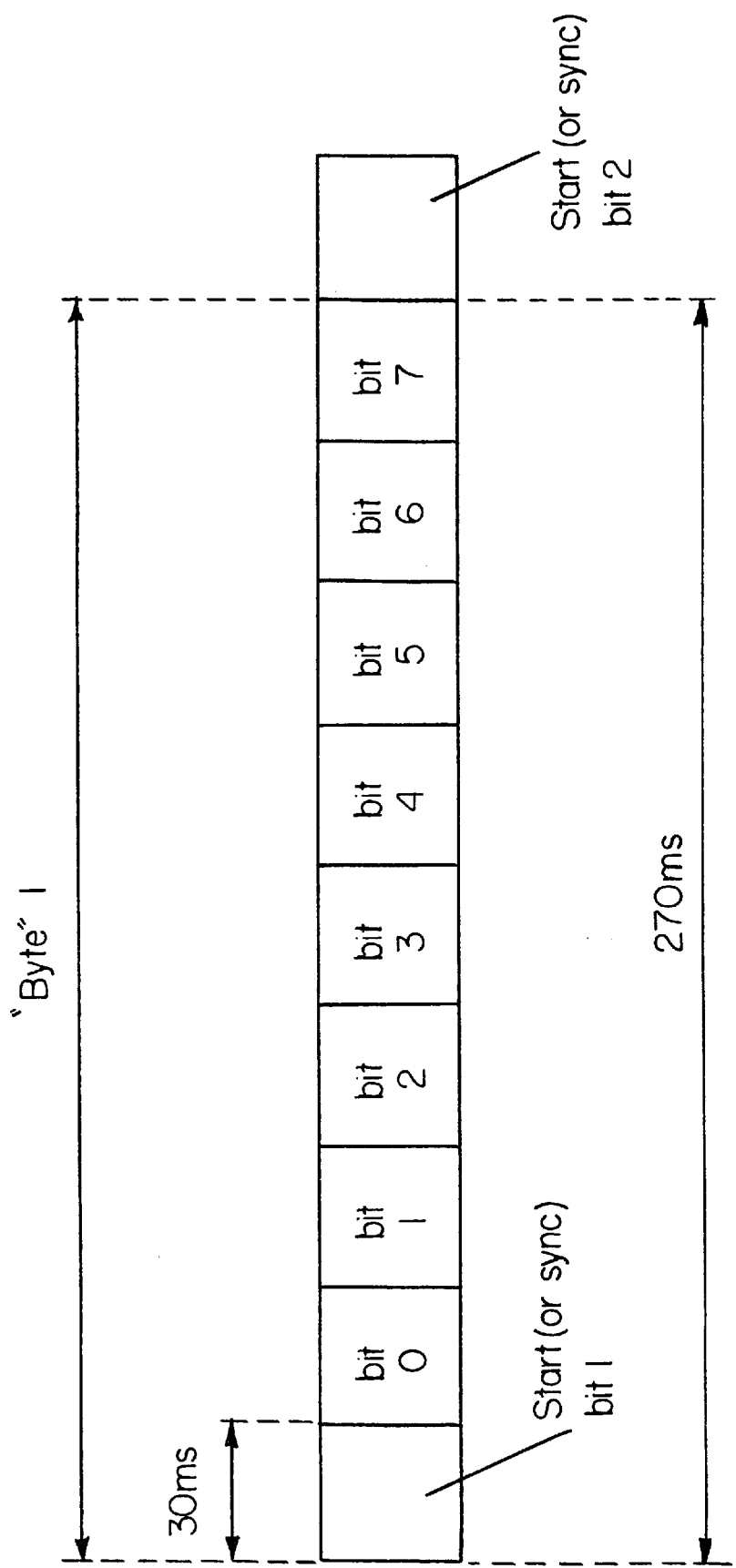
FIG. 2A is a diagram showing how the data bits are arranged within each byte of the packets shown in FIG. 2.

With reference in particular to FIGS. 2, 2A and 3, in the present system a "byte" of data comprises a series of 9 data bits. In the audible signal generated by buzzer 5 and each bit is represented by a particular tone/frequency, for example, the $5^{th}$ data bit in each 9 bit byte is always represented by a particular frequency, preferably 3.1 kHz. When a bit is true/1 the tone is generated, when the bit is false/0 no tone is generated. At the start of each 9 bit byte there is an extra bit this is the start bit, it is always present and is used by the extractor software for synchronisation (referred to in this specification as the "sync bit"). Accordingly, as shown in FIG. 2A, each 9 bit byte comprises 8 data bits preceded by a sync bit.

All bits including the start bit are 30 ms in length, this length was determined by the Q (quality factor) requirements of the filter used to extract each bit, the higher the Q of the filter the less crosstalk there is between bits/frequencies. The length of each bit (30 ms) can be shorter but this would compromise the performance of the download with respect to the distance from the appliance to the telephone.

In this example 9 distinct frequencies are used. We have found that the time between any one frequency being reused should be as long as possible, this is important for handling large echo times that are present in the environment that this system will be used. Accordingly, by maximally separating each of the frequencies in time, the extraction software is able to ignore echo signals arriving at the telephone mouthpiece at a time when a different frequency signal is expected. A lesser number of frequencies could be used but the time for a single frequency to be reused should not be less than, for example, 100 ms. That is, the minimum number of frequencies=(100 ms/bit duration (ms))+1. The number of frequencies used will also be influenced by the ability of the buzzer in the appliance to generate those frequencies at a satisfactory amplitude.

It should be noted that the start bit frequency must only be used for the start bit (the reason for this will become apparent later). The way in which the frequencies are assigned to each bit is of importance, the frequencies are assigned in such a way (see table 1) that there is a maximum space between the bits in frequency as well as time (that is when a given tone for a bit is used the next tone (in frequency) is not used for a minimum of 3 bits (150 Hz), this keeps the crosstalk between bits to a minimum). We have arranged that the start bit uses the highest frequency, this is one of the most separated frequencies (the lowest frequency is the other).

TABLE 1

| bit No. | frequency No. | frequency (Hz) | frequency (Hz) |
|---------|---------------|----------------|----------------|
| Start   | 0             | 3200           | 150            |
| 0       | 3             | 3050           | 150            |
| 1       | 6             | 2900           | 250            |
| 2       | 1             | 3150           | 150            |
| 3       | 4             | 3000           | 150            |
| 4       | 7             | 2850           | 250            |
| 5       | 2             | 3100           | 150            |
| 6       | 5             | 2950           | 150            |
| 7       | 8             | 2800           |                |

Packet

As may be seen in FIG. 2, the data signal transmitted by buzzer 5 is made up of a series of packets. An important note to make before explaining the packet format is that each packet is analysed individually and therefore is designed to contain all the information required for its extraction, no information is used from other packets to reproduce the original packets from the analogue signal recorded on personal computer 13.

The packets are compiled by control means 2 in a digital form and then converted to an equivalent analogue signal for transmission by buzzer 5. Each packet has 11 bytes (each byte containing 8 data bits and a start/sync bit), the first byte is always FFHex (or $FF). This byte is in the packet so that each bit is represented at least once. This is important for the extraction software, for it needs to know what the signal strength for a true/1 is. The next 8 bytes contain data in the start bit+8 data bit format. The last 2 bytes of each packet contain the CRC (cyclical redundancy check) code for the packet, this CRC code is the result of a calculation performed using the FFHex byte and the 8 data bytes as is well known in the art. The reliability of the CRC code will be explained below in the section about the extraction software. There is no space (time) between each byte in the packet.

Packets

The first packet in the download is a reference packet and all the bytes in this packet are FFHex (including the CRC-code bytes. The timing for the packets is shown in FIG. 2. The number of data packets is of course unimportant but affects the total download time, accordingly it would be beneficial to minimise the total amount of data to be transmitted.

Description of Recorder Software
Outline

The tones produced by the washing machine buzzer 5 are recorded directly from the connection to the telephone line by the personal computer 13 using a sound card connected to the telephone line. As the incoming tones are recorded the software will automatically detected the start and end of the download (stopping the recording of the incoming signal).

Sync Acquisition

The raw input data is obtained and recorded in memory of personal computer 13, preferably in 512 byte (8 bit) blocks. In order to determine, for example, when a download has started or stopped, the recorder part of the software detects the start/sync bits and analyses their positions relative to each other. As all the sync detecting actions of the recorder must be carried out in real time (and while the recording is taking place), the minimum requirements of computer 13 are preferably of an INTEL PENTIUM 166 MHz processor running MICROSOFT WINDOWS NT4.0 or faster.

The first step in the recorder software is to filter the raw incoming waveform (in addition to storing it). The filter frequency is at the start bit freq (sync bit) so that only the start bits are passed. The filter is applied for 18.15 ms with 4.5 ms intervals, this is done so that the personal computer can carry out the necessary calculations in real time and the algorithm does not require any more information than this to find the sync bits. The second thing that happens at this time is the peak input value for the last 46.4 ms is worked out and stored. Every second, 220.5 filter pointers are recorded and 21.5 peek values.

Next, the filter results are integrated. This integration is carried out over a 30 ms period (the time period for 1 bit/start bit/sync bit) and an integration result is calculated for every filter result. The filtered waveform is integrated (in real time) as the area or energy of the signal is more important than the amplitude in deciding if a peak is actually a sync/start bit.

Next the sync/start bits are found in the integrated wave (described below). The sync detector software only analyses the last 3.375 s of recording when looking for sync bits, this is because all the signal conditions it is looking for will fit into this period, the signal conditions are end of a download and start of a new download.

Sync detection

It should be noted that this will only cover the detection of the sync bits, not the signal conditions (their detection is described below). An example is shown in FIG. 4 wherein 7 sync bits are present in the last 3.375 s of input. The software takes all of the last 3.375 s and works out the maximum point and takes the 30% (of maximum) level as the threshold for what is and is not a sync bit.

Signal Condition Detection

After the sync bits have been located (note that if more than 11 or less than 1 sync bit/s have been found then the software will not analyse for signal conditions as the data is obviously in error) the next step is to look for the following conditions, either end of a download or start of a new download.

End of a download

For this condition the software looks for a greater than or equal to 2.0 s space (no sync bits) from the newest sync bit to the start of the 3.375 s window if this is found it will then check there at least 3 sync bits in the 3.375 s window. If that is true then it checks the gap between the 3 sync bits to see if it is greater than 0.21 s and less than 0.33 s (0.27 s nominal) and if that is the case then the end of a download has been found (see FIG. 5 for an example).

Start of a new download

Figure 6:
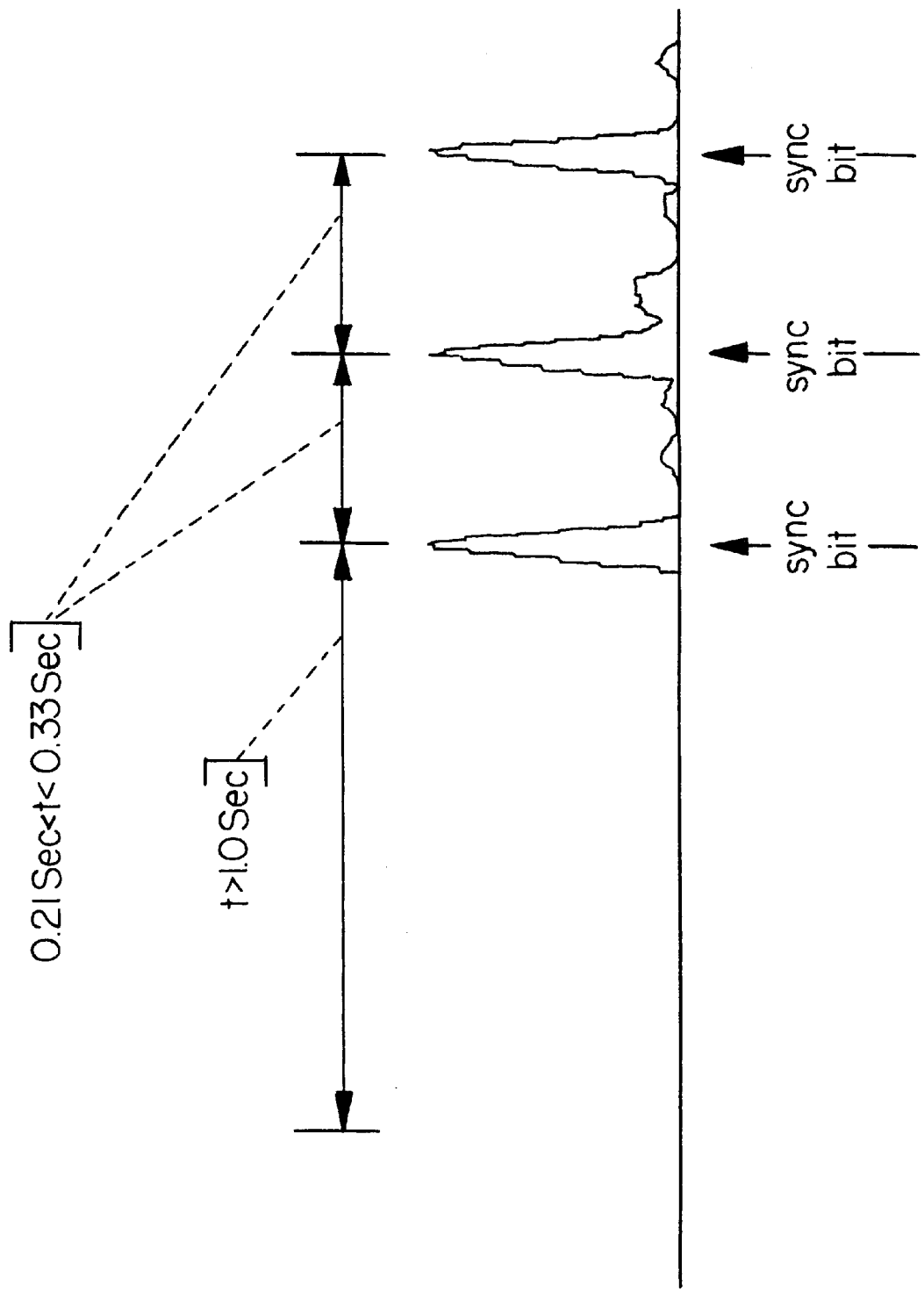
FIG. 6 is a graph of signal strength versus time for part of the data signal transmitted in FIG. 1 which has been filtered at the frequency of the start/sync to demonstrate a start of new download condition.

For this condition the software looks for a greater than or equal to 2.0 s space (no sync bits) from the oldest sync bit to the end of the 3.375 s window if this is found it will then check there at least 3 sync bits in the 3.375 s window. If that is true then it checks the gap between the 3 sync bits to see if it is greater than 0.21 s and less than 0.33 s (0.27 s nominal), if that is the case then the start of a new download has been found (see FIG. 6 for an example).

End of Recorder Execution

When the end of a download is detected the software will take the recorder input and trim off the ends so that the waveform that is given to the extractor software is only as long as it need to be, this is to make it as fast as possible. The position of the sync/start bits can also be passed to the extractor software although the extractor software carries out its own, more accurate detection of start/sync bits (not in real time).

Description of the Extractor Software

The extractor software takes the raw waveform outputted from the recorder and extracts the data signal from it, it does this in several steps. Each step of the extraction will be described separately.

Sync Bit Extraction

The first step in the extractor phase is to locate all of the sync bits, record their position in time and check that the determined positions are all correct in time. The data that is provided to the extractor is the raw recorded waveform. The detection of sync bits is performed in a fashion to that carried out by the recorder phase of the software, the main difference is that the extractor analyses all of the raw waveform.

The first thing to be done is to find the first sync bit. For the first sync bit to be valid there must be a period of 0.9 s of no signal leading up to it. From this point the extractor will use this first sync bit as a reference in time for finding the remaining sync bits in the packet and the first sync bit in the next packet (it should be noted that when the first sync bit of the next packet is found it is used as the new reference point so that the extractor does not suffer from accumulated timing errors when checking the timing of sync bits). Because the timing of transmitted sync bits is exact the extractor will skip 240 ms of raw waveform after each sync bit is found before looking for the next (note that sync bits are spaced 270 ms apart). When a sync bit is not found where it is expected to be that fact is recorded in a list of sync bits, when all the sync bits in the raw waveform are found the list of sync bits will contain an entry for all possible sync bits, recording their position or recording if they were not found.

Data Bit Extraction

Filter

The first step in extracting the data is to filter the raw waveform at each of the frequencies that represent each of the data bits. The filter frequencies could be searched for to find the peak signal for each bit using the known frequencies the software uses as a starting point. The frequency search would solve any problem of the frequencies moving due to product hardware.

Filter in time

Figure 7:
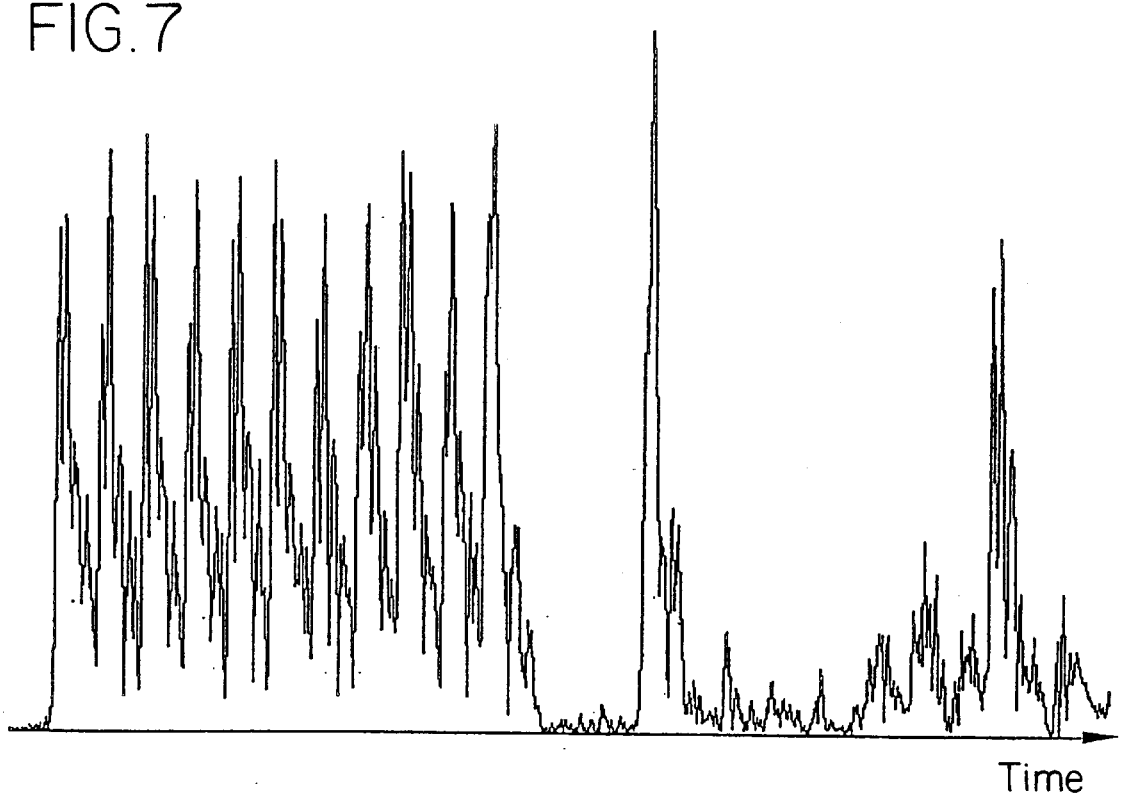
FIG. 7 is a graph of signal strength versus time for two packets from the data signal transmitted in FIG. 1 after the frequency domain data bit extraction filter has been applied.
Figure 8:
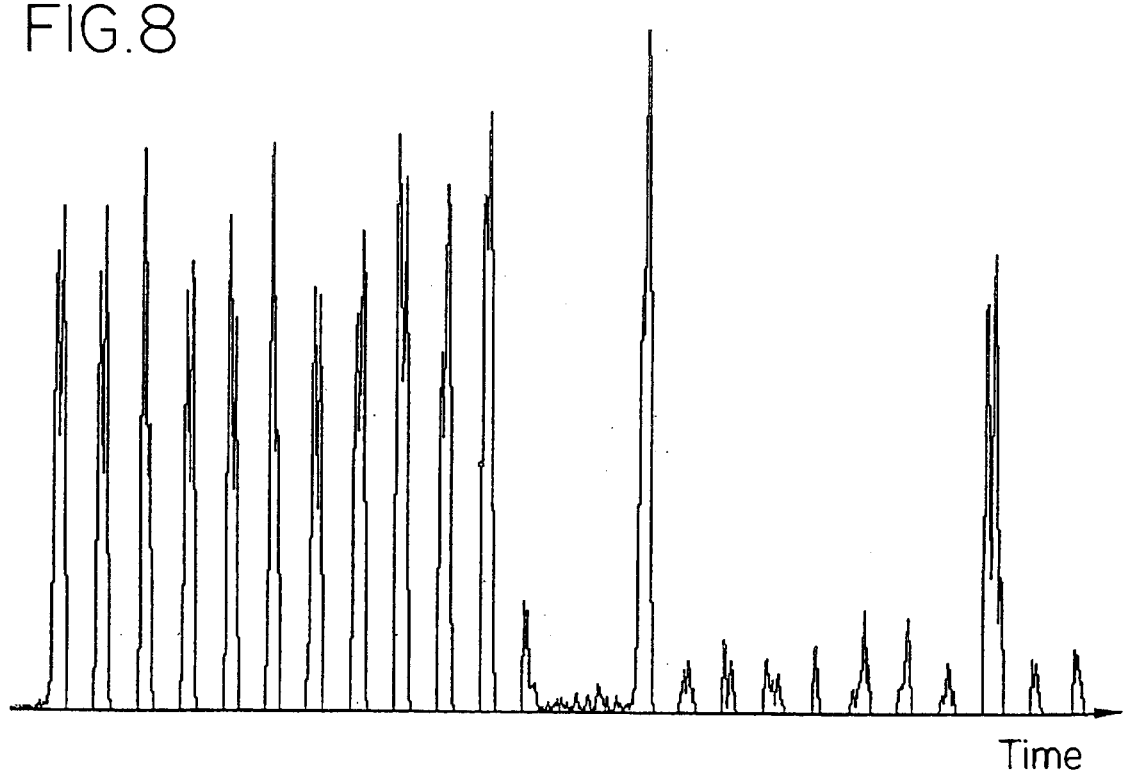
FIG. 8 is a graph of signal strength versus time for the two packets of FIG. 7 after the time domain filter has been applied.

The next step is to filter each "frequency filter result" in time, this is done to eliminate any echo of a bit and crosstalk from other bits. The process will be described as it relates to one bit, all bits are the same except for the timing of the application. With respect to each sync bit each bit should appear (if present) in a known position in time, so knowing this information the extractor will multiply the "frequency filter result" around the known position of a bit by a bell shaped curve. This is done for all the bits with a known sync bit. The bell curve is only 2 bits wide and is multiplied with the "frequency filter result" for a bit width in time, therefore the remainder of the byte is multiplied by zero. A bell shaped curve is used so a bit that is slight incorrect in time will still be passed trough the filter but if a bit is more incorrect in time it will progressively be eliminated the further away from its correct position it is. FIG. 7 shows two packets after the filter for a bit is applied but before the filter in time is applied. FIG. 8 shows the same waveform after the filter for time is applied.

Bit presence

Now that all the bit waveforms have been filtered in time the extractor will determine if a bit is present (true) or not (false). This process is carried out for each packet and each bit separately but is the same for all bits and packets. First, a check is made that all the start bits in a packet are known. If this is true then for a given bit the filtered in time waveform is added up for 270 ms starting at the known position of the bit. The result of this integration is the "presence value" and is calculated for the same bit in each byte of the packet giving 11 presence values for a bit in a packet. Next the maximum presence value is determined and all the bit presence values are scaled to that maximum value. After all bits in each packet are analysed there will be 8*12=96 sets of presence values, each set containing 11 values. FIG. 9 shows the bit presence values (for bits 0 to 7) from the first two packets (A and B), it can be seen that for a given bit the presence value is scaled to the maximum presence for a given packet (that is each of the values for a particular bit are scaled so that the maximum value is 100).

Bit presence threshold

Now that all of the bit presence values are known, the next step is to find a threshold value that can be used to determine whether a particular bit is in a true or false state in order to reconstruct the original data. Anything below this threshold value will become a false/0 while anything above will become a true/1.

Preferably two threshold values are determined but only one may be used (this is explained below). Up to two thresholds (but at least one) are found for each bit, for each packet, for example bit 0, packet 0 (12 packets*8 bits=96 and possibly up to 192 threshold values). The first threshold picked will be 1% below the top of the largest gap between presence values, the second threshold will be the next largest gap but only if that gap is larger than 20% (see the example histogram of FIG. 10 which is for the data in FIG. 9 in the right hand half of row b0). That is, the presence values for each bit position within a packet are analysed to find where the one or two largest gaps occur between the values. The threshold value could be placed anywhere in the gap but for convenience we have decided that the threshold will be 1% beneath the value at the top of the gap. In the example shown in FIG. 10, the horizontal axis has been divided in to 5% blocks but in practice the software is capable of 1% increments. FIG. 11 shows the threshold values determined for bits 0 to 7 of packet 0 (PA) to packet 11 (PL). The right hand half of the table holds a number of second threshold values.

Data extraction

The last step is to extract the data from the recorded signal. Using the first thresholds found for each bit, for each packet (for example bit 0, packet 0) the presence level for each byte is turned into a 1 (true) or 0 (false) depending on whether the presence level is above (1, true) or below (0, false) the threshold value. This comparison is carried out for every byte in the packet for every bit.

Once all the bytes in a packet have been extracted the first 9 bytes are used to calculate the CRC code which is compared to the last two bytes (the transmitted CRC code) and if they are equal the data is taken to be correct. If the CRC codes do not match the second thresholds are used to determine new, alternative bit states and the new CRC value is then checked. This process is repeated until good data (matching CRC codes) is found or no possible combinations of second thresholds are available. With 8 second thresholds possible (one for each bit position) it is possible to attempt 256 different extraction combinations in the data). With every attempt at extracting valid data the random chance increases of obtaining a bad data CRC code (bad data) and bad transmitted CRC code which actually match (65535/attempts), lowering the integrity of the data extracted (if the CRC's match).

FIG. 12 shows the final results obtained from an actual download (as do the other figures) with the packet contents displayed across the table. The final column indicates if the error checking was successful (OK=error checking successful using first threshold, OK3=error checking successful using third threshold).

In an addition to the system described above, it would also be possible for the service person to instruct personal computer 13 to pass electronic control signals back to the washing machine via the PSTN to emanate from transducer 10 of the earpiece of handset 9 of the user's telephone. If the user were to hold the earpiece of the handset near the speaker/buzzer 5 then it would act as a microphone, relaying the information in the sound energy from transducer 10 to control means 2 in the form of audio electrical signals having the electronic control signals encoded therein. The electronic control signals could then be processed by controller 2 causing changes in status or settings within the washing machine to overcome some problems or faults. The transmitted signal could also represent new or updated operating software which could then be stored by the controller of the washing machine in memory for execution during normal operation of the appliance.

An improvement to the above mentioned system could be the removal of the reference packet (packet 0, comprising 11*FFHex). A further improvement could be to add a further byte in each packet to serve as a packet number identifier. It would be useful to know the packet number in cases such as when the beginning or end of a download has been cut off.

Thus it can be seen that at least in the preferred form of the present invention, a low cost system remote diagnostic system for producing, transmitting and reliably extracting valuable usage and fault information from a remote appliance to a service centre is provided. The system disclosed has the advantage of utilising existing hardware found in most if not all existing appliances with only software alterations required to realise the invention. It is anticipated that the present invention will save a service person considerable time in identifying and remedying faults and it is hoped that many faults could be remedied over the telephone due to the information which will now be available to the service person at their remote location.

We claim:

1. An appliance comprising:
   sound generating means adapted to, upon appropriate energisation, produce audible tones ordinarily provided as a warning and/or verification signal to a user,
   user input means to allow a user to enter instructions to said appliance,
   data storage means which stores information on the operation of said appliance, control means which stores a program which causes the controller to:

i) receive said instructions from said user input means, ii) enter a special operating mode in response to said user input, and iii) energize said sound generating means to issue audible tones in a predetermined sequence corresponding to information stored in said data storage means.

2. An appliance as claimed in claim 1 wherein said sound generating means comprise an audio speaker or buzzer.

3. An appliance as claimed in claim 1 or claim 2 wherein said control means controls the duration of said audible tones emanating from said sound generating means so that said audible tones correspond to said information.

4. An appliance as claimed in claim 1 or claim 2 wherein said control means controls the frequency of said audible tones emanating from said sound generating means so that said audible tones correspond to said information.

5. An appliance as claimed in claim 1 or claim 2 wherein said audible tones are adapted to be received by signal conversion means positioned remotely to said appliance, there existing an air gap between said appliance and said signal conversion means, said signal conversion means converts said audible tones into an electronic signal which may then be transmitted to a remote receiving means electronically.

6. An appliance as claimed in claim 5 wherein said signal conversion means comprise a telephone handset.

7. An appliance as claimed in claim 5 wherein said remote receiving means comprise a further control means which receives said electronic signal and extracts said information relating to the operation of said appliance.

8. An appliance as claimed in claim 7 wherein said remote receiving means and further control means are also provided with output means to output said information.

9. An appliance as claimed in claim 7 wherein said remote receiving means and further control means are also provided with second data storage means which stores said information.

10. A method of controlling an appliance, said appliance having sound generating means adapted to, upon appropriate energisation, produce audible tones ordinarily provided as a warning and/or verification signal to a user, user input means to allow a user to enter instructions to said appliance, data storage means which stores information on the operation of said appliance, control means which controls the operation of said appliance, said method comprising the steps of:

i) receiving said instructions from said user input means, ii) entering a special operating mode in response to said user input, and iii) energizing said sound generating means to issue audible tones in a predetermined sequence corresponding to information stored in said data storage means.

11. An appliance as claimed in claim 10 wherein said sound generating means comprise an audio speaker or buzzer.

12. An appliance as claimed in claim 10 or claim 11 wherein said step of energising said sound generating means comprises controlling the duration of said audible tones emanating from said sound generating means so that said audible tones correspond to said information.

13. An appliance as claimed in claim 10 or claim 11 wherein said step of energising said sound generating means comprises controlling the frequency of said audible tones emanating from said sound generating means so that said audible tones correspond to said information.

14. An appliance as claimed in claim 10 or claim 11 wherein said method also includes the step of:

iv) receiving said audible tones at a signal conversion means positioned remotely to said appliance, there existing an air gap between said appliance and said signal conversion means, v) converting said audible tones into an electronic signal, and vi) transmitting said electronic signal to a remote receiving means electronically.

15. An appliance as claimed in claim 14 wherein said signal conversion means comprise a telephone handset.

16. An appliance as claimed in claim 14 wherein said remote receiving means comprise a further control means and said method includes the step of:

vii) receiving said electronic signal, and viii) extracting said information relating to the operation of said appliance from said electronic signal.

17. An appliance as claimed in claim 16 wherein said remote receiving means and further control means are also provided with output means and said method includes the step of outputting said information to said output means.

18. An appliance as claimed in claim 16 wherein said remote receiving means and further control means are also provided with second data storage means and said method also includes the step of storing said information in said second data storage means.

* * * * *

UNITED STATES PATENT AND TRADEMARK OFFICE
CERTIFICATE OF CORRECTION

PATENT NO. : 5,987,105
DATED : November 16, 1999
INVENTOR(S) : Jonathan Peter Jenkins and David Charles Rhodes It is certified that error appears in the above-identified patent and that said Letters Patent is hereby corrected as shown below:

Column 6, Line 24

TABLE 1

"frequency" should re -- frequency gap --

Column 8, Line 2 "2.0s" should be -- 1.0s --

Signed and Sealed this

Seventeenth Day of October, 2000

Attest:

Q. TODD DICKINSON

*Attesting Officer*      *Director of Patents and Trademarks*